(12) United States Patent
Sonta et al.

(10) Patent No.: US 11,545,708 B2
(45) Date of Patent: Jan. 3, 2023

(54) METHODS FOR MANUFACTURING A POUCH-TYPE BATTERY CELL HAVING POLYMERIC CONFORMAL EDGE COATINGS

(71) Applicant: GM GLOBAL TECHNOLOGY OPERATIONS LLC, Detroit, MI (US)

(72) Inventors: Kestutis A. Sonta, Troy, MI (US); James W. Boswell, III, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 444 days.

(21) Appl. No.: 16/686,806

(22) Filed: Nov. 18, 2019

(65) Prior Publication Data
US 2021/0151720 A1 May 20, 2021

(51) Int. Cl.
*H01M 50/124* (2021.01)
*C08G 59/18* (2006.01)
(Continued)

(52) U.S. Cl.
CPC .......... *H01M 50/124* (2021.01); *B32B 7/023* (2019.01); *C08F 2/50* (2013.01); *C08G 59/184* (2013.01); *H01M 50/1245* (2021.01)

(58) Field of Classification Search
CPC . H01M 50/124; H01M 50/1245; B32B 7/023; C08F 2/50; C08G 59/184
See application file for complete search history.

(56) References Cited

U.S. PATENT DOCUMENTS

| | | | |
|---|---|---|---|
| 6,632,538 B1 * | 10/2003 | Yamazaki | H01M 50/178 429/254 |
| 2007/0264535 A1 * | 11/2007 | Lee | H01M 50/579 429/7 |

(Continued)

FOREIGN PATENT DOCUMENTS

| | | | |
|---|---|---|---|
| KR | 1020120048407 | * | 5/2012 |
| KR | 20150050081 A | | 5/2015 |
| KR | 1020150050081 | * | 5/2015 |

OTHER PUBLICATIONS

KR 1020150050081MT.*

(Continued)

*Primary Examiner* — Alexander Usyatinsky
(74) *Attorney, Agent, or Firm* — Quinn IP Law

(57) ABSTRACT

Methods for manufacturing a pouch-type battery cell include disposing one or more electrode pairs between a first aluminum pouch layer and a second aluminum pouch layer, sealing the first pouch layer and the second pouch layer to form a peripheral seal joining the first pouch layer and the second pouch layer to form a pouch with an outer edge encasing the anode and the cathode, applying a photocatalytic polymer coating precursor to the outer edge of the pouch, and photo-curing the photocatalytic polymer coating precursor to form a conformal edge coating. The photocatalytic polymer coating precursor includes one or more photo-initiators, one or more acrylates, and one or more polyamines. The polyamines can include tertiary amines including α-CH functional groups, diamines represented by the formula H2N—R—NH2, wherein R represents saturated and unsaturated aliphatic moieties, and N,N'-(2,2-dimethylpropylidene) hexamethylenediamine. The photo-initiators can include Diphenyl(2,4,6-trimethylbenzoyl) phosphine oxide, 2,2-Dimethoxy-2-phenylacetophenone, and p-tert-butylphenyl 1-(2,3)-epoxy)propyl ether.

20 Claims, 5 Drawing Sheets

(51) Int. Cl.
*C08F 2/50* (2006.01)
*B32B 7/023* (2019.01)

(56) References Cited

U.S. PATENT DOCUMENTS

| | | | | |
|---|---|---|---|---|
| 2008/0107963 A1* | 5/2008 | Lee | ...................... | H01M 50/116 |
| | | | | 205/255 |
| 2011/0172175 A1* | 7/2011 | Chow | ...................... | A01C 1/06 |
| | | | | 514/772.3 |
| 2019/0112500 A1* | 4/2019 | Berger | ................ | C09D 175/14 |

OTHER PUBLICATIONS

KR20150050081 (A): An English language Abstract of the foreign language document is provided herewith, which was obtained from Espacenet (http://worldwide.espacenet.com).

\* cited by examiner

METHODS FOR MANUFACTURING A POUCH-TYPE BATTERY CELL HAVING POLYMERIC CONFORMAL EDGE COATINGS

BACKGROUND

Assemblies of lithium-ion battery cells are finding increasing applications in providing motive power in automotive vehicles. Battery cells of various other chemistries, such as lithium-sulfur, are also candidates for such applications. Each cell of the battery is capable of providing an electrical potential of several volts (e.g., about three to four volts) and a direct electrical current based on the composition and mass of the electrode materials in the cell. The cell is capable of being discharged and re-charged over many cycles. A battery is assembled for an application by combining a suitable number of individual cells in a combination of electrical parallel and series connections to satisfy voltage and current requirements for a specified electric load, such as a traction motor for a vehicle.

In a battery application for an electrically powered vehicle, the assembled battery may, for example, comprise up to three hundred cells that are electrically interconnected to provide up to eight hundred volts and sufficient electrical power to an electrical traction motor to drive a vehicle. Sometimes, groups of battery cells are placed in pouches or packages for assembly and interconnection in forming a specified battery voltage and power requirement. There is a desire to reduce the cost of producing the respective elements of each electrochemical cell, and there is a continual desire to improve the function and reliability of each element of the battery.

SUMMARY

Methods for manufacturing a pouch-type battery cell are provided, and can include disposing one or more electrode pairs between a first pouch layer and a second pouch layer, sealing the first pouch layer and the second pouch layer along a peripheral seal path to form a peripheral seal joining the first pouch layer and the second pouch layer to form a pouch with an outer edge encasing the anode and the cathode, applying a photocatalytic polymer coating precursor to the outer edge of the pouch, and photo-curing the photocatalytic polymer coating precursor to form a conformal edge coating. Each pouch layer can include an aluminum layer. The photocatalytic polymer coating precursor can include one or more photo-initiators, one or more acrylates, and one or more polyamines. The photo-initiator comprises a UV-photo-initiator. The one or more photo-initiators can include Diphenyl(2,4,6-trimethylbenzoyl) phosphine oxide, 2,2-Dimethoxy-2-phenylacetophenone, p-tert-butylphenyl 1-(2,3)-epoxy)propyl ether, and combinations thereof. The one or more photo-initiators can be up to about 2 wt. % of the photocatalytic polymer coating precursor. The one or more polyamines can include one or more tertiary amines including α-CH functional groups, diamines represented by the formula H2N—R—NH2, wherein R represents saturated and unsaturated aliphatic moieties, N,N'-(2,2-dimethylpropylidene) hexamethylenediamine, and combinations thereof. The one or more polyamines can be about 15 wt. % to about 30 wt. % of the photocatalytic polymer coating precursor. The one or more acrylates can include one or more urethane acrylate oligomers and one or more acrylate monomers. The one or more acrylate monomers can include isobornyl acrylate, hexanediol diacrylate, trimethylenepropane triacrylate, tripropyleneglycol diacrylates, isobornyl methacrylate, methyl acetoacetate, hexamethylene diacrylate, and combinations thereof. The one or more acrylates can be about 70 wt. % to about 85 wt. % of the photocatalytic polymer coating precursor. Photo-curing the photocatalytic polymer coating precursor to form a conformal edge coating can include contacting the photocatalytic polymer coating precursor with a UV light. The photocatalytic polymer coating precursor can photo-cure to form the conformal edge coating in under 15 seconds. The first pouch layer and the second pouch layer can each further include a heat-activated polymer adhesive layer disposed inside the respective aluminum layer of the first pouch layer and the second pouch layer. Each of the one or more electrode pairs can include an anode including an anode current collector and a cathode including a cathode current collector. The method can further include electrically coupling an anode tab to the one or more anode current collectors within the pouch and electrically coupling a cathode tab to the one or more cathode current collectors within the pouch, and the anode tab and the cathode tab each extend outward from the peripheral seal of the pouch.

Methods for manufacturing a pouch-type battery cell are provided and can include disposing one or more electrode pairs between a first pouch layer and a second pouch layer, sealing the first pouch layer and the second pouch layer along a peripheral seal path to form a peripheral seal joining the first pouch layer and the second pouch layer to form a pouch with an outer edge encasing the anode and the cathode, applying a photocatalytic polymer coating precursor to the outer edge of the pouch, and photo-curing the photocatalytic polymer coating precursor to form a conformal edge coating by contacting the photo-curing photocatalytic polymer coating precursor with a UV light for less than 20 seconds. Each pouch layer can include an aluminum layer. The photocatalytic polymer coating precursor can include one or more photo-initiators, one or more urethane acrylate oligomers, one or more acrylate monomers, and one or more polyamines. The one or more photo-initiators can be up to about 2 wt. % of the photocatalytic polymer coating precursor, the one or more urethane acrylate oligomers and the one or more acrylate monomers can collectively be about 70 wt. % to about 85 wt. % of the photocatalytic polymer coating precursor, and the one or more polyamines can be about 15 wt. % to about 30 wt. % of the photocatalytic polymer coating precursor. The UV light can have a wavelength of about 375 nm to about 415 nm. The photocatalytic polymer coating precursor can be applied to the outer edge of the pouch by spraying or dipping. The photocatalytic polymer coating precursor can include less than about 0.01 wt. % volatile organic compounds. The photo-curing can occur at a temperature of about 15° C. to about 25° C.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are methods for applying conformal anticorrosion and electrical insulating coatings to the edges of aluminum pouch-type battery cells. Under certain pouch failure conditions, the aluminum pouch layers are susceptible to alloying with lithium when at ground voltage. The coatings block a ground path between the exposed pouch edges and thereby prevent oxidation of any lithium-aluminum alloys. Use of photo-catalytic polymer coating precursors provide an efficient, volatile organic chemical (VOC)-free process for applying such coatings to pouch-type battery cells which are adaptable to current process line footprints and executable at room temperature.

Figure 1:
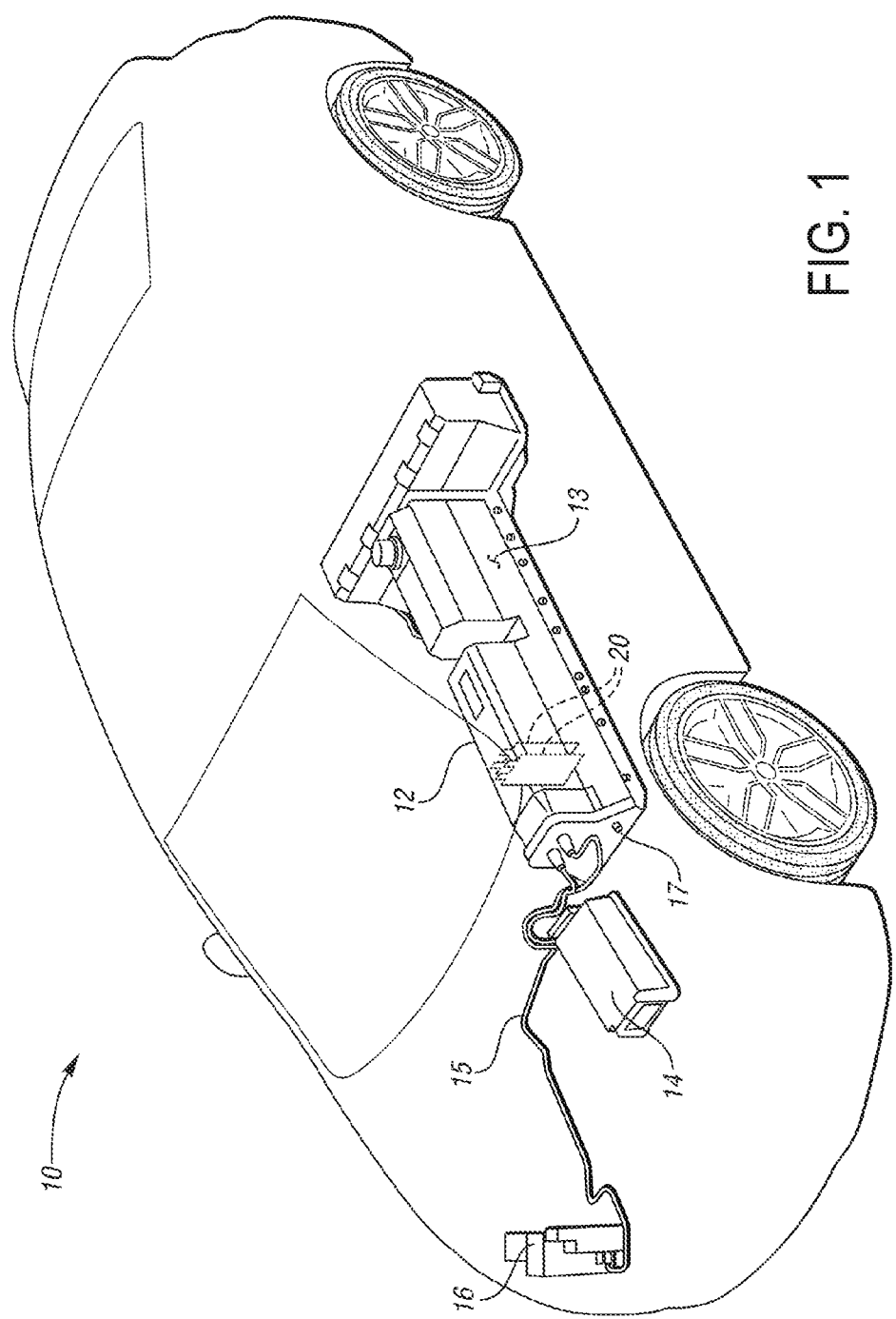
FIG. 1 illustrates a schematic perspective view of an electric vehicle, according to one or more embodiments.

FIG. 1 illustrates a schematic perspective view of an electric vehicle 10 having a direct current (DC) battery pack 12. The battery pack 12 includes a housing 13, e.g., a T-shaped housing as shown. The battery pack 12 may contain a plurality of identically-configured battery cells 20. One possible configuration of the battery pack 12 includes at least 192 such battery cells 20 collectively outputting at least 18 kWh of electrical power, although the battery pack 12 is not limited to such an embodiment. The housing 13 may be in fluid communication with a source of coolant (not shown), e.g., via a coolant port 17, with admitted coolant circulating with respect to the battery cells 20 to help regulate a temperature of the battery cells 20 of the battery pack 12. Other embodiments may be envisioned having different shapes, power ratings, and/or active materials other than lithium ion-based chemistries, and therefore the T-shaped configuration of FIG. 1 is exemplary and non-limiting.

The electric vehicle 10 of FIG. 1 may be configured as a mobile or a stationary system of any type that may benefit from the use of electrical energy stored in the various battery cells 20. Examples of the electric vehicle 10 may include a vehicle as shown, e.g., an extended-range electric vehicle, a plug-in hybrid electric vehicle, a battery electric vehicle, or another mobile platform, robot, or stationary/non-vehicular system such as a power plant.

The electric vehicle 10 may further include an electric machine (not shown) such as a traction motor and/or a motor/generator unit that is powered by energy from the battery pack 12. Additionally, the electric vehicle 10 may include a power inverter 14 that is electrically connected to a charging module 16 via high voltage cables 15. The power inverter 14 receives alternating current (AC) power from the charging module 16 when the charging module 16 is plugged into an available charging outlet (not shown). The power inverter 14 may use pulse-width modulation or other power switching techniques to transform the AC voltage from the charging module 16 into a DC voltage suitable for charging the battery cells 20, as is well known in the art.

Figure 2A:
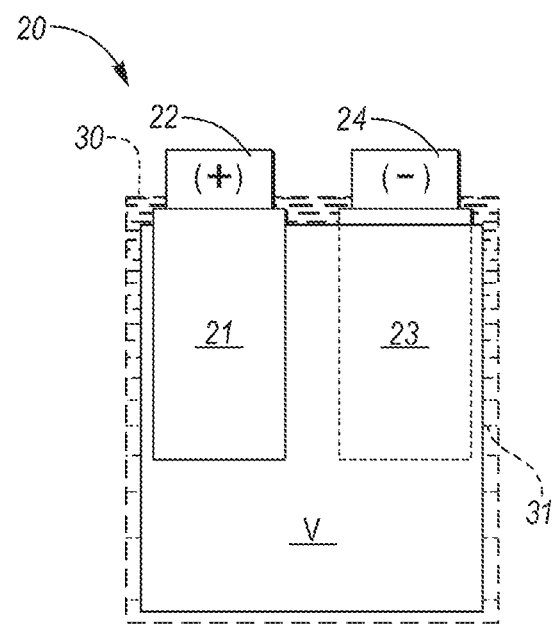
FIG. 2A illustrates a top view of a battery pouch cell, according to one or more embodiments.
Figure 2B:
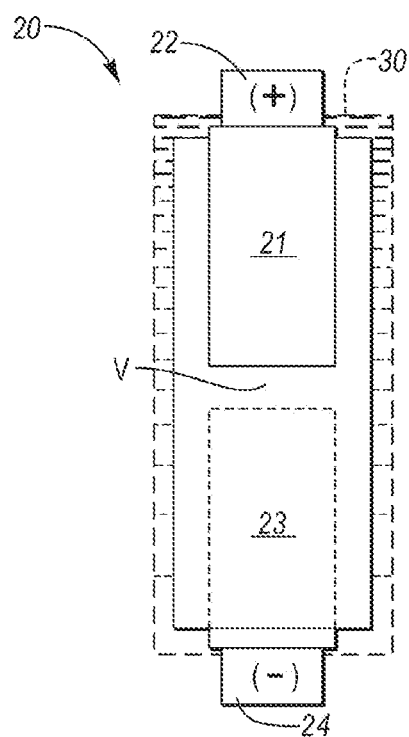
FIG. 2B illustrates a top view of a battery pouch cell, according to one or more embodiments.
Figure 3A:
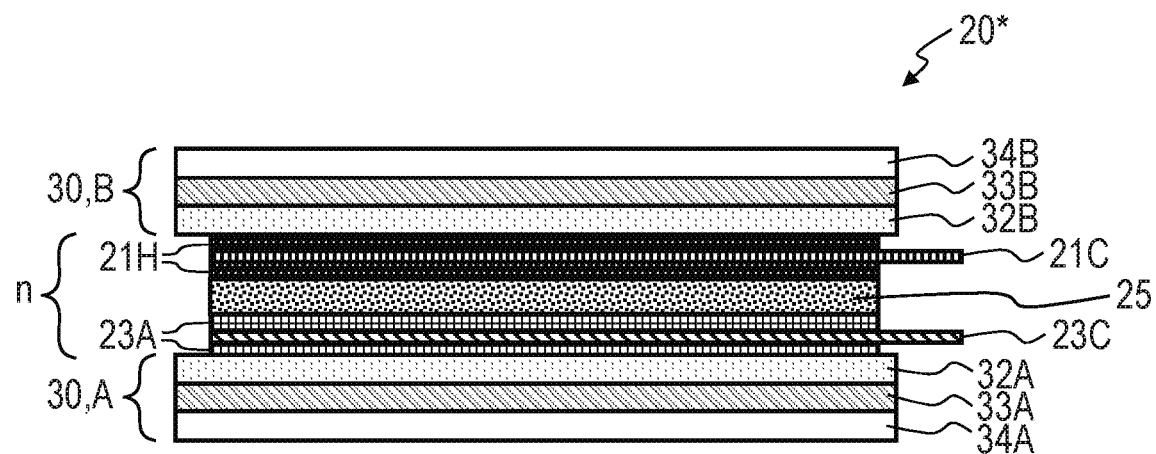
FIG. 3A illustrates a cross-sectional side-view of an unsealed battery pouch cell, according to one or more embodiments.
Figure 3B:
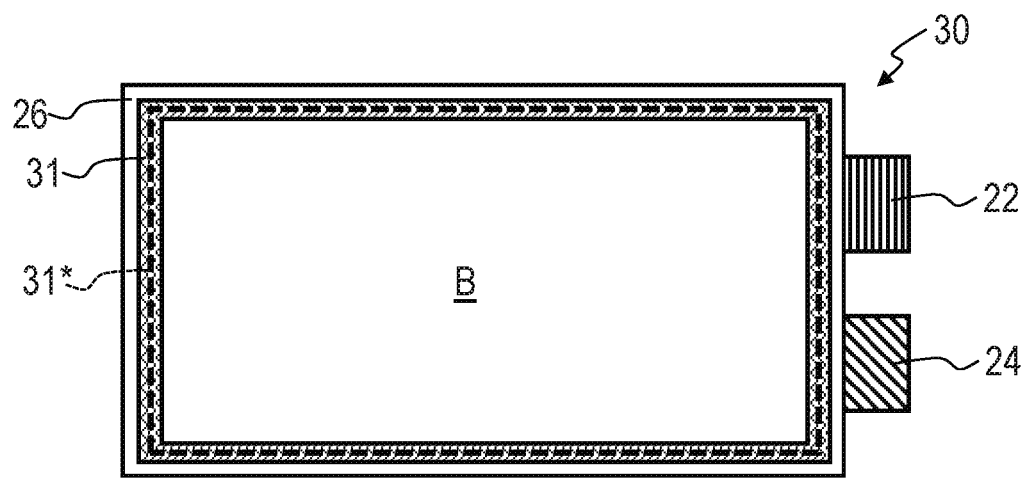
FIG. 3B illustrates a top view of a sealed battery pouch cell, according to one or more embodiments.

The battery pack 12 includes a plurality of pouch-type battery cells 20, two of which are shown in FIG. 1 for illustrative simplicity. FIGS. 2A-B each illustrate top views of examples of such battery cells 20. FIG. 3A illustrates a cross-sectional side-view of a battery cell 20 with an unsealed pouch 20*. FIG. 3B illustrates a top view of a sealed battery pouch cell 30, including a peripheral seal 31 and conformal edge coating 26. Each battery cell 20 includes one or more (n) electrode pairs, each including an anode 21 and a cathode 23, contained within a sealed pouch 30. For example, a battery cell can include 20 to 30 electrode pairs contained within the sealed pouch 30, in some embodiments.

As illustrated in FIG. 3A, the pouch 30 comprises a first pouch layer A and a second pouch layer B. Each pouch layer A,B can include an inner heat-activated polymer adhesive layer 32A, 32B, a middle layer 33A, 33B, and an outer corrosion resistant polymer layer 34A,34B, for example, although it is understood that pouches comprising different compositions and orientations of layers are practicable. One or more electrode pairs, each electrode pair including an anode 21 and a cathode 23, are disposed between the first pouch layer A and the second pouch layer B. Heat can be applied to the outer corrosion resistant polymer layer 34A or 34B of the first pouch layer A or the second pouch layer B (e.g., via a laser, hot press, etc.) along a peripheral seal path 31* (see FIG. 3B) to form a peripheral seal 31 joining the first pouch layer A and the second pouch layer B to form a pouch 30 encasing the one or more electrode pairs.

In some embodiments, the outer corrosion resistant polymer layer(s) 34A and/or 34B can comprise a thickness of about 1 μm to about 100 μm. In some embodiments, the outer corrosion resistant polymer layer(s) 34A and/or 34B can comprise a thickness of about 10 μm. In general, the thickness of the outer corrosion resistant polymer layer(s) 34A and/or 34B is selected to provide suitable corrosion resistance protection to the respective middle layers 33A and 33B without adding undesirable weight or cost to the battery cell 20. The outer corrosion resistant polymer layer(s) 34A and/or 34B can comprise one or more polymeric materials such as polypropylene, polyethylene, high density polyethylene (HDPE), and low-density polyethylene (LDPE), among others. The outer corrosion resistant polymer layer(s) 34A and/or 34B can further comprise materials such as nylon to enhance the mechanical properties of the layer(s).

The middle layer(s) 33A and/or 33B can comprise aluminum, or any other metal which is malleable and able to be formed in thin sheets. In some embodiments, the middle layer(s) 33A and/or 33B can comprise a thickness of about 25 μm to about 200 μm, or about 50 μm to about 150 μm. In general, the thickness of the middle layer(s) 33A and/or 33B is selected to provide suitable mechanical properties without adding undesirable weight or cost to the battery cell 20. The middle layer(s) 33A and/or 33B can comprise pure aluminum, or aluminum alloys (e.g., 1100 or 3000 series aluminum alloys), and can be aluminum foils, in some embodiments.

In some embodiments, the inner heat-activated polymer adhesive layer(s) 32A and/or 32B can comprise a thickness of about 1 μm to about 100 μm, or about 10 μm. In general, the thickness of the inner heat-activated polymer adhesive layer(s) 32A and/or 32B is selected to enable sufficient melting of the layers via the heat source to subsequently adhere and form the peripheral seal 31 while not allowing direct contact between (i.e., insulating) the middle layers 33A and 33B, or between the middle layers 33A and 33B and the anode tab 22 or the cathode tab 24. The inner heat-activated polymer adhesive layer(s) 32A and/or 32B can comprise one or more polymeric materials, such as polypropylene, polyethylene, HDPE, and LDPE, among others, and additionally one or more adhesive materials, such as polyacrylate, polyacrylic, and carboxymethyl cellulose (CMC).

Each anode 21 comprises a current collector 21C with host material 21H applied thereto, and each cathode 23 comprises a current collector 23C with active material 23A applied thereto. The anode current collector 21C can comprise copper or copper alloys, for example. The cathode current collector 23 can comprise aluminum or aluminum alloys, for example. The pouch 30 includes a peripheral seal 31 defining an internal volume V and is filled with electrolyte which contacts the host material 21H and active material 23A of each anode 21 and cathode, respectively 23. The anode 21 and cathode 23 are electrically isolated via a separator 25 which facilitates the movement of electrolyte and ions within the electrolyte between the anode 21 and the cathode 23. Various orientations of cell electrodes are possible, including the side-by-side configuration illustrated in FIG. 2A or the end-to-end configuration illustrated in FIG. 2B, among others.

Figure 4:
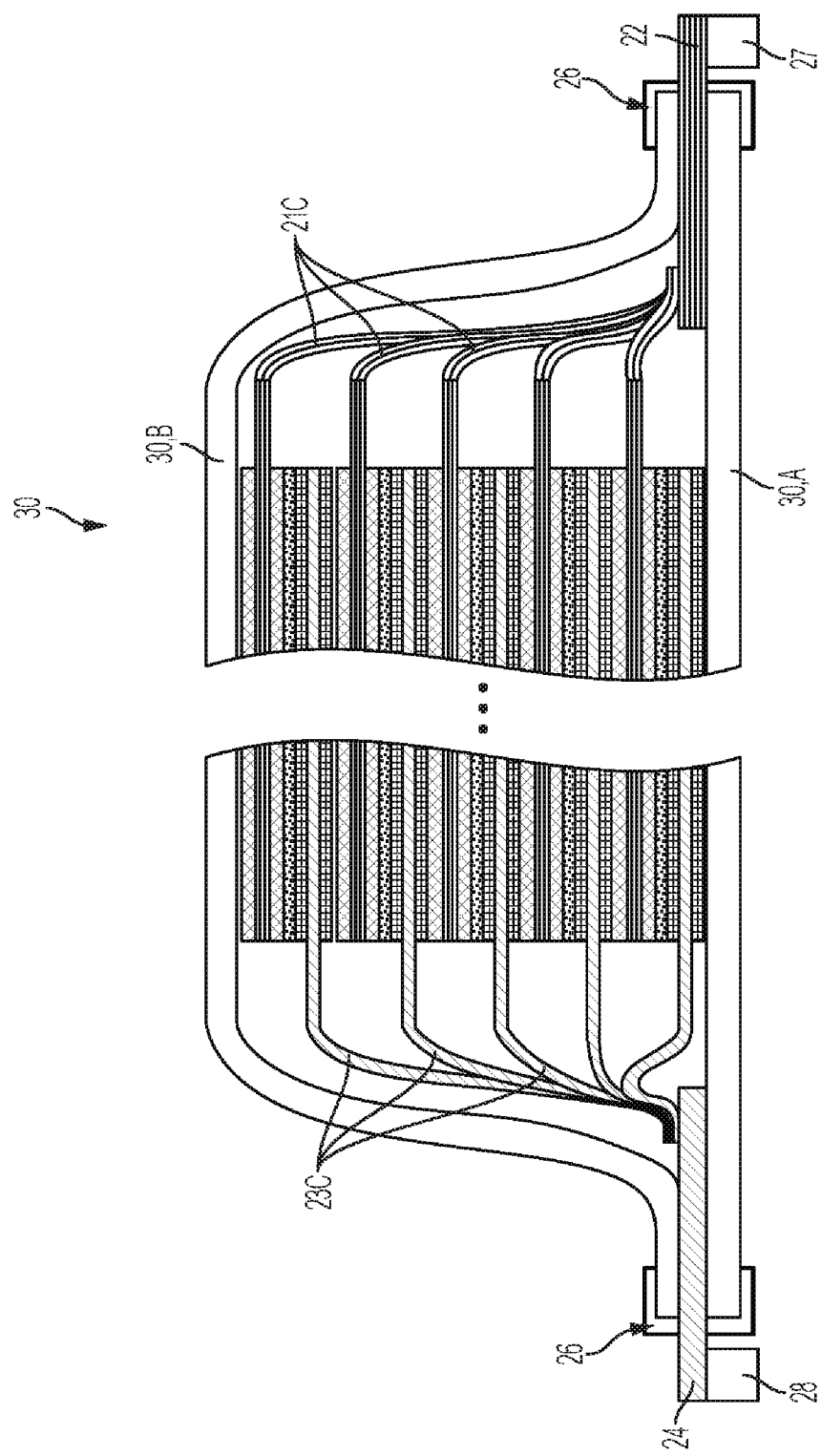
FIG. 4 illustrates a cross-sectional side-view of a battery cell with a sealed pouch, according to one or more embodiments.

FIG. 4 illustrates a cross-sectional side-view of a battery cell 20 with a sealed pouch 30. The battery cell 20 in FIG. 4 includes 5 electrode pairs, although the embodiment is intended to also include lesser or greater numbers of electrode pairs. As shown in FIG. 4, each of the anode 21 current collectors 21C converge and join to an anode tab 22 and each of the cathode 23 current collectors 23C converge and join to a cathode tab 24. The current collectors can be ultrasonically welded to the tabs, for example. The anode tab 22 is electrically coupled to an anode busbar 27, and the cathode tab 24 is electrically coupled to a cathode busbar 28. In a battery pack (e.g., battery pack 12), a plurality of anode tabs 22 from different battery cells 20 can be joined to one or more anode busbars 27, and, similarly, a plurality of cathode tabs 24 from different battery cells 20 can be joined to one or more cathode busbars 28.

Figure 5:
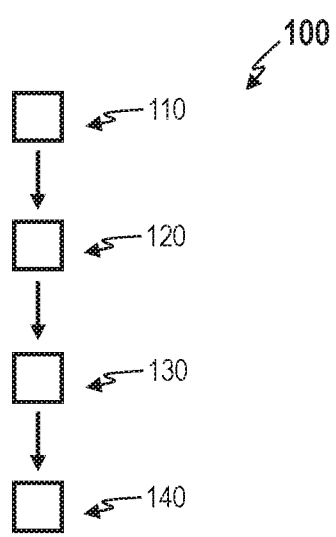
FIG. 5 illustrates a block diagram of a method for manufacturing a pouch-type battery cell, according to one or more embodiments.

FIG. 5 illustrates a method 100 for manufacturing a pouch-type battery cell, which includes applying a conformal edge coating 26 (as shown in FIGS. 3A and 4) to the outer edge of pouch 30. Method 100 comprises disposing 110 one or more electrode pairs between a first pouch layer (e.g., 30A) and a second pouch layer (e.g., 30B), wherein each pouch layer includes an aluminum layer (e.g., 33A, 33B), sealing 120 the first pouch layer and the second pouch layer along a peripheral seal path (e.g., 31*) to form a peripheral seal (e.g., 31) joining the first pouch layer and the second pouch layer to form a pouch (e.g., 30) with an outer edge encasing the anode and the cathode, applying 130 a photocatalytic polymer coating precursor to the outer edge of the pouch, and photo-curing 140 the photocatalytic polymer coating precursor to form a conformal edge coating (e.g., 26).

Applying 130 the photocatalytic polymer coating precursor can be accomplished by spraying, for example with a variable spray nozzle, or dipping, in some embodiments. The photocatalytic polymer coating precursor can comprise one or more photo-initiators, one or more acrylates, and one or more polyamines. The one or more acrylates comprise one or more urethane acrylate oligomers and one or more acrylate monomers. The one or more acrylates can comprise about 70 wt. % to about 85 wt. % or about 75 wt. % to about 80 wt. % of the photocatalytic polymer coating precursor. Urethane acrylate oligomers are isocyanate terminated polyols (hydroxyl terminated oligomers) and can be formed by reacting hydroxyl terminated oligomers with isocyanates, and optionally with hydroxyethyl acrylates, to form photo-activatable acrylate functional groups from the hydroxyl and isocyanate moieties. The one or more acrylate monomers can comprise isobornyl acrylate, hexanediol diacrylate, trimethylenepropane triacrylate, tripropyleneglycol diacrylates, isobornyl methacrylate, methyl acetoacetate, hexamethylene diacrylate, and combinations thereof. Multifunctional acrylate monomers can beneficially increase the glass transition temperature of the cured conformal edge coatings.

The one or more polyamines can comprise one or more tertiary amines including α-CH functional groups, one or more diamines represented by the formula H2N—R—NH2, wherein R represents saturated and unsaturated aliphatic moieties, N,N'-(2,2-dimethylpropylidene) hexamethylenediamine, and combinations thereof. The polyamines act as chain transfer agents during photo-curing and polymerize the one or more acrylates of the photocatalytic polymer coating precursor to form the cured conformal edge coating. The one or more polyamines can comprise about 15 wt. % to about 30 wt. %, about 20 wt. % to about 30 wt. %, or about 20 wt. % to about 25 wt. % of the photocatalytic polymer coating precursor.

The photo-initiator can be a UV photo-initiator which is activated when exposed to UV light, and generally disassociate to generate reactive species (i.e., free radicals) that initiate or otherwise encourage polymerization reactions between the one or more acrylates and the polyamines. In some embodiments, the one or more photo-initiators can comprise Diphenyl(2,4,6-trimethylbenzoyl) phosphine oxide, 2,2-Dimethoxy-2-phenylacetophenone, p-tert-butylphenyl 1-(2,3)-epoxypropyl ether, and combinations thereof. In some embodiments, the one or more photo-initiators can comprise up to about 1.0 wt. %, 1.5 wt. %, or up to about 2 wt. % of the photocatalytic polymer coating precursor. In some embodiments, the one or more photo-initiators can comprise about 0.5 wt. % to about 1.0% wt., or about 0.2 wt. % to about 2.0 wt. % of the photocatalytic polymer coating precursor.

Accordingly, in some embodiments, the one or more photo-initiators can comprise up to about 2 wt. % of the photocatalytic polymer coating precursor, the one or more urethane acrylate oligomers and the one or more acrylate monomers collectively can comprise about 70 wt. % to about 85 wt. % of the photocatalytic polymer coating precursor, and the one or more polyamines can comprise about 15 wt. % to about 30 wt. % of the photocatalytic polymer coating precursor. Advantageously, the photocatalytic polymer coating precursor comprises substantially no volatile organic compounds (VOC) (i.e., less than about 0.01 wt. % VOCs).

Photo-curing 140 the photocatalytic polymer coating precursor comprises applying a light of a suitable wavelength to the photocatalytic polymer coating precursor in order to activate the photo-initiator to cure the photocatalytic polymer coating precursor. Photo-curing 140 can comprise applying a UV light to the catalytic polymer coating precursor. For example, the UV light can have a wavelength of about 375 nm to about 415 nm, or about 385 nm to about 405 nm. Photo-curing 140 can occur for less than 20 seconds or less than 15 seconds to form a cured conformal edge coating. Advantageously, photo-curing the photocatalytic polymer coating precursor can occur at room temperature (e.g., at about 15° C. to about 25° C.).

Example 1

A photocatalytic polymer coating precursor was prepared by preparing a first acrylate prepolymer (A) by mixing polypropylene glycol, isophorone diisocyanate, and triethanolamine in a 1:2:0.7 molar ratio with a catalyst dibutyl tin dilaureate (constituting 0.5% wt. of the mixture), and then combining methyl acetoacetate with the mixture such that methyl acetoacetate comprised 20 wt. % to 30 wt. % the mixture. A second acrylate diluent (B) was prepared by mixing polypropylene glycol, isophorone diisocyanate, and triethanolamine in a 1:2:0.7 molar ratio with a catalyst dibutyl tin dilaureate (constituting 0.5% wt. of the mixture), and then combining hexamethylene diacrylate with the mixture such that hexamethylene diacrylate comprised 5 wt. % to 10 wt. % the mixture. (A) and (B) were combined in a 3:1 ratio, and N,N'-(2,2-dimethylpropylidene) hexamethylenediamine (C) was additionally combined in an amount 20 wt. % to 30 wt. % of the (A)+(B) mixture. Photo-initiator diphenyl(2,4,6-trimethylbenzoyl) phosphine oxide was then added in amount 0.5 wt. % to 1.0% wt. of the (A)+(B)+(C) mixture.

By varying the ratio of (A) to (B) the flexibility and strength of the coating formed by curing the photocatalytic polymer coating precursor can be altered. Hexamethylenediamine (C) was added to enhance the flexibility of the resulting cured coating by increasing the linearity of the cured polymer and providing additional reactive sites to facilitate crosslinking during curing. keep the reaction going and crosslinking. Increasing the amount of hexamethylenediamine (C) within the photocatalytic polymer coating precursor causes the cured coating to become increasingly soft/tacky, whereas decreasing the amount of hexamethylenediamine (C) within the photocatalytic polymer coating precursor causes the cured coating to become increasingly brittle and prone to cracking.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for manufacturing a pouch-type battery cell, the method comprising:
   disposing one or more electrode pairs between a first pouch layer and a second pouch layer, wherein each of the first and second pouch layers includes an aluminum layer;
   sealing the first pouch layer and the second pouch layer along a peripheral seal path to form a peripheral seal joining the first pouch layer and the second pouch layer to form a pouch with an outer edge encasing the one or more electrode pairs;
   applying a photocatalytic polymer coating precursor to the outer edge of the pouch, wherein the photocatalytic polymer coating precursor comprises one or more photo-initiators, one or more acrylates, and one or more polyamines, wherein the one or more acrylates comprise one or more urethane acrylate oligomers and one or more acrylate monomers, and wherein the one or more acrylates comprise about 70 wt. % to about 85 wt. % of the photocatalytic polymer coating precursor; and
   photo-curing the photocatalytic polymer coating precursor for approximately 20 seconds or less to form a conformal edge coating.

2. The method of claim 1, wherein the one or more photo-initiators comprise a UV-photo-initiator.

3. The method of claim 1, wherein the one or more photo-initiators comprise Diphenyl(2,4,6-trimethylbenzoyl) phosphine oxide, 2,2-Dimethoxy-2-phenylacetophenone, p-tert-butylphenyl 1-(2,3)-epoxy)propyl ether, and/or combinations thereof.

4. The method of claim 1, wherein the one or more photo-initiators comprise up to about 2 wt. % of the photocatalytic polymer coating precursor.

5. The method of claim 1, wherein the one or more polyamines comprise one or more tertiary amines including α-CH functional groups, diamines represented by the formula H2N—R—NH2, wherein R represents saturated and unsaturated aliphatic moieties, N,N'-(2,2-dimethylpropylidene) hexamethylenediamine, and/or combinations thereof.

6. The method of claim 1, wherein the one or more polyamines comprise about 15 wt. % to about 30 wt. % of the photocatalytic polymer coating precursor.

7. The method of claim 1, further comprising forming the one or more urethane acrylate oligomers by reacting hydroxyl terminated oligomers with isocyanates.

8. The method of claim 1, wherein the one or more acrylate monomers include isobornyl acrylate, hexanediol diacrylate, trimethylenepropane triacrylate, tripropyleneglycol diacrylates, isobornyl methacrylate, methyl acetoacetate, hexamethylene diacrylate, and/or combinations thereof.

9. The method of claim 1, wherein the one or more acrylates comprise about 75 wt. % to about 80 wt. % of the photocatalytic polymer coating precursor.

10. The method of claim 1, wherein photo-curing the photocatalytic polymer coating precursor to form the conformal edge coating comprises contacting the photocatalytic polymer coating precursor with a UV light.

11. The method of claim 1, wherein the photocatalytic polymer coating precursor photo-cures to form the conformal edge coating in under 15 seconds.

12. The method of claim 1, wherein the first pouch layer and the second pouch layer each further comprises a heat-activated polymer adhesive layer disposed inside the respective aluminum layer of the first pouch layer and the second pouch layer.

13. The method of claim 1, wherein each of the one or more electrode pairs comprises an anode including an anode current collector and a cathode including a cathode current collector.

14. The method of claim 13, further comprising:
electrically coupling an anode tab to the anode current collectors of the one or more electrode pairs within the pouch; and
electrically coupling a cathode tab to the cathode current collectors of the one or more electrode pairs within the pouch,
wherein the anode tab and the cathode tab each extends outward from the peripheral seal of the pouch.

15. A method for manufacturing a pouch-type battery cell, the method comprising:
disposing one or more electrode pairs between a first pouch layer and a second pouch layer;
sealing the first pouch layer and the second pouch layer along a peripheral seal path to form a peripheral seal joining the first pouch layer and the second pouch layer to form a pouch with an outer edge encasing the one or more electrode pairs;
applying a photocatalytic polymer coating precursor to the outer edge of the pouch, wherein the photocatalytic polymer coating precursor comprises one or more photo-initiators, one or more urethane acrylate oligomers, one or more acrylate monomers, and one or more polyamines and wherein the one or more urethane acrylate oligomers and the one or more acrylate monomers comprise about 70 wt. % to about 85 wt. % of the photocatalytic polymer coating precursor; and
photo-curing the photocatalytic polymer coating precursor to form a conformal edge coating by contacting the photo-curing photocatalytic polymer coating precursor with a UV light for less than 20 seconds.

16. The method of claim 15, wherein the one or more photo-initiators comprise up to about 2 wt. % of the photocatalytic polymer coating precursor, the one or more urethane acrylate oligomers and the one or more acrylate monomers collectively comprise about 75 wt. % to about 80 wt. % of the photocatalytic polymer coating precursor, and the one or more polyamines comprise about 15 wt. % to about 30 wt. % of the photocatalytic polymer coating precursor.

17. The method of claim 15, wherein the UV light has a wavelength of about 375 nm to about 415 nm.

18. The method of claim 15, wherein the photocatalytic polymer coating precursor is applied to the outer edge of the pouch by spraying or dipping.

19. The method of claim 15, wherein the photocatalytic polymer coating precursor comprises less than about 0.01 wt. % volatile organic compounds.

20. The method of claim 15, wherein the photo-curing occurs at a temperature of about 15° C. to about 25° C.

* * * * *